United States Patent [19]

Abbas et al.

[11] 3,717,852

[45] Feb. 20, 1973

[54] ELECTRONICALLY REWRITABLE READ-ONLY MEMORY USING VIA CONNECTIONS

[75] Inventors: Shakir A. Abbas, Wappingers Falls; Paul G. Stern, Poughkeepsie, both of N.Y.

[73] Assignee: International Business Machines Corporation, Armonk, N.Y.

[22] Filed: Sept. 17, 1971

[21] Appl. No.: 181,503

[52] U.S. Cl.........340/173 SP, 340/166 R, 340/173 R

[51] Int. Cl...........................G11c 17/00, G11c 11/36

[58] Field of Search..........340/173 SP, 173 R, 166 R

[56] References Cited

UNITED STATES PATENTS

| | | | |
|---|---|---|---|
| 3,245,051 | 4/1966 | Robb | 340/173 SP |
| 3,576,549 | 4/1971 | Hess | 340/173 SP |
| 3,641,318 | 2/1972 | Tollet | 340/173 SP |

OTHER PUBLICATIONS

Abbas, Electrically Encodable Read-Only Store, 11/70, IBM Technical Disclosure Bulletin, Vol. 13 No. 6, pp. 1426–1427.

Gaensslen, Schottky Barrier Read-Only Memory, 6/71, IBM Technical Disclosure Bulletin, Vol. 14 No. 1, p. 252.

Simon, Read-Only Memory, 5/70, IBM Technical Disclosure Bulletin, Vol. 12 No. 12, p. 2127.

*Primary Examiner*—Bernard Konick
*Assistant Examiner*—Stuart Hecker
*Attorney*—Thomas F. Galvin et al.

[57] ABSTRACT

An electronically rewritable read-only memory comprising an integrated semiconductor array of P-N junctions formed in a semiconductor substrate. A dielectric film is formed on the surface of the substrate on top of which a thin metallic film is deposited. The dielectric is thinner above an active region of each of the junctions than it is above the other regions of the substrate. When a suitable voltage is applied across the metallic film and dielectric, the metallic film diffuses through the dielectric film at the thinner areas, thereby forming ohmic via connections with the active junction regions. At the same time, the dielectric "-self-heals" i.e., the via connections are disconnected from the metallic film around the periphery of the thin areas of the dielectric. A second layer of metallization over the metallic film establishes conductive contact between the layer and the active junction region. The contacts can be broken at selected junctions by passing a current through the diffused metallization. The contacts can be reestablished at selected junctions by applying a suitable healing voltage across the metallic film and the dielectric.

18 Claims, 8 Drawing Figures

INVENTORS
SHAKIR A. ABBAS
PAUL G. STERN

BY Thomas F. Galvin
AGENT

ELECTRONICALLY REWRITABLE READ-ONLY MEMORY USING VIA CONNECTIONS

BACKGROUND OF THE INVENTION

1. Field of the Invention

This invention relates to read-only memories. More particularly, this invention relates to a read-only memory formed in a semiconductor substrate which is rewritable by electronic means.

2. Description of the Prior Art

Memories are one of the basic components in a computer. They store instructions for operating the computer as well as numbers which are processed by the computers. Memories fall into two elemental categories — non-permanent and permanent. The former, often termed read-write memories, may be altered quickly and continuously during the operation of the computer to receive new instructions or data. While read-write memories are essential in modern, high-speed computers because of this characteristic, there are many applications where continuous alteration is not necessary. For example, certain instructions and information are rarely changed and do not require the use of a read-write feature. In these instances, permanent or read-only memories (ROM) are all that is required. In general, when compared to the read-write memory, the ROM has a faster access time, requires less complex and fewer auxiliary circuits and is less expensive to fabricate. Thus, the ROM is a powerful tool in computer design in terms of economy and speed of operation; and it is presently being used in an ever-increasing variety of ways in digital computers. For example, a read-only memory is commonly used as a control matrix to generate sequences of control words, each word comprising a set pattern of binary digits associated with a particular gating function. More recently, a new type of computer completely controlled by a ROM which directs the operation of various logic units and I/O devices has become prominent in commercial applications. Such computers, often termed microprogrammed computers, offer an inexpensive means of interfacing between a central computer and various I/O devices.

The most common definition of a read-only memory is one which is permanently programmed during its fabrication and which cannot be altered by the system in which it operates. The definition itself discloses a principal limitation present in read-only memories — they cannot be altered. More accurately stated, there have been some proposals for rewritable or alterable read-only memories but these designs suffer from various defects. Most importantly, we know of no feasible suggestion in the prior art for an alterable ROM employing integrated semiconductor devices.

One prior art technique uses a stored card placed between the word lines and the sense lines of a memory matrix. At each intersection of the matrix a bit of information is stored on the information card by punching a hole in the card at each intersection. The hole creates an increased capacitance between the work line and the sense line which may represent a binary "1." The absence of a punched hole represents a binary "0." This type of memory may be altered by removing one card and replacing it with another or by punching holes at previously integral locations on the card and covering up locations which have holes. This kind of system would not be acceptable in modern computers because the capacity of such a memory is very limited and the replacement of one card with another is physically cumbersome and often results in a destruction of the old card.

More recently, designers in this field have attempted to develop an alterable read-only memory which comprises a semiconductor diode array. The benefits of using semiconductors to achieve this result are quite clear. There is nothing in this art which can match semiconductors for density, speed and inherent reliability. They presently dominate the data processing hardware industry, being used in both logic and memory areas.

One proposal for an alterable ROM has been published in the IBM Technical Disclosure Bulletin, Volume 13, No. 1, June, 1970, pages 263–264. In that article, Krick describes the basic memory cell as being a pair of complementary MNOS field-effect transistors Q1 and Q2. The first cell would be a P type, the second cell an N type. The operation of the cell is based on the fact that a write voltage of a given polarity has opposite effects on the thresholds of the N and P type devices. This type of memory, however, has certain drawbacks which has limited its utility. For one thing, each cell requires 2 transistors; the usual read-only memory array requires but one active device per cell. In addition, the requirement for complementary devices poses a relatively difficult fabrication process because the most common FET integrated circuit arrays comprise transistors of the same conductivity type in a given semiconductor chip. Moreover, in the embodiment shown by Krick in the referenced publication, the cells are not fabricated in integrated circuit form but are discrete devices formed on an insulating sapphire substrate due to a requirement for bit line isolation for writing of information into a cell.

SUMMARY OF THE INVENTION

It is therefore an object of this invention to provide an electronically rewritable read-only memory fabricated in integrated circuit form.

It is a further object of this invention to increase the density and operating speed of rewritable read-only memories.

It is a still further object of this invention to achieve a rewritable semi-permanent memory which can be rewritten repeatedly and reliably by electronic means.

The present invention accomplishes these and other objects in a planar semiconductor structure which preferably comprises a matrix of P-N junctions, at least one active region of the junctions being coplanar with the surface of the semiconductor body. In the preferred embodiment of the invention the P-N junctions are used as diodes. A layer of dielectric material is formed over the semiconductor body, the dielectric being thinner over the active region of each diode. A thin metallic film is deposited over the dielectric; and a potential applied across the metal and dielectric causes the metal to diffuse through the dielectric, making an ohmic via connection to the active region of each diode. The diffusion "self-heals," i.e., the conductive contact between the metallic film and the diffused filament is disrupted around the thin areas of the dielectric. A second layer of metal deposited on the thin metallic film reestablishes the connection.

The via connections, as the diffused filaments are called, can be broken selectively by applying a current pulse through selected filaments. The via connections can be reformed selectively by applying a voltage across selected broken filaments. The rewriting cycle of selectively breaking and reforming via connections, thereby breaking and making ohmic contact between one active region of each diode and the metallic layer is repeatable.

The foregoing and other objects, features and advantages of the invention will be apparent from the following more particular description and preferred embodiments of the invention as illustrated in the accompanying drawings.

DESCRIPTION OF THE PREFERRED EMBODIMENT

One basic mechanism involved in the initial steps of fabricating the inventive alterable ROM device is the "-self-healing" property of a dielectric film coated with a thin metallic film. This property has been discussed in the literature; however, it will be worthwhile to briefly discuss "self-healing" prior to the description of the preferred embodiment of the present invention.

The literature discussing the phenomenon is sparse. In Trans. IEEE, ED–13, p. 788 (1966), Klein reported that an electric field applied across the metal and silicon in MOS capacitors causes the oxide to break down. The breakdown can be either shorting or nonshorting. Subsequently, in J. Electro-Chem. Soc.: Solid State Science, Vol. 117, No. 1, p. 127 (1970), Wang et al. found that a thin $SiO_2$ film on a silicon substrate would break down at a potential near the bulk breakdown of the film. The breakdown caused a conductive connection to be made between thin aluminum electrodes atop the dielectric and contacts underneath at weak or particularly thin areas of the dielectric. Wang et al also noted that the breakdowns were "self-heaing" because the thin aluminum film degenerated around the dielectric breakdown area, resulting in a disconnection from the potential source.

Figure 1:
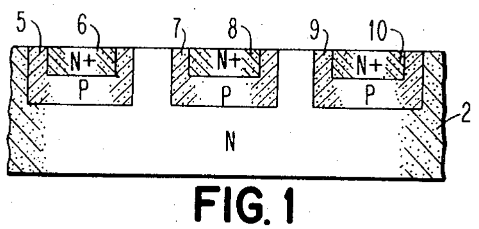
FIGS. 1–5 are sectional views of the steps of initially forming a diode array.

Referring now to FIG. 1, there is shown a semiconductor substrate 2 which is illustrated as having a N type conductivity. Formed within substate 2 are P regions 5, 7 and 9, and N+ regions 6, 8, and 10, which respectively form three diodes. In a typical embodiment the semiconductor substrate contains a matrix of such diodes, there being over one thousand diodes formed within one semiconductor chip. For ease of fabrication and electrical connection, the P regions are diffused conventionally as channels along the length of the substrate, isolation being provided by the N type substrate. The N+ regions are diffused by suitable masking techniques symmetrically into the P channels as undivided cells. This type of structure and its method of fabrication is conventional in the semiconductor art. The N substrate may be silicon which is deposited on a semiconductor body not shown. For the purposes of the present invention, the particular structure of diode is unimportant except that the surface of one of the diode regions must be coplanar with the surface of the semiconductor to ensure conductive contact with conductors which will be formed on the upper surface of the substrate 2. In the preferred embodiment herein described, the surface contact is made to the N+ regions. In addition, ohmic contacts for writing and sensing purposes are made to the P channels at metallic connections usually formed at the periphery of the semiconductor chip. At this time, those of skill in the semiconductor art are well aware of the techniques previously described and are able to make various modifications to suit individual requirements.

Figure 2:
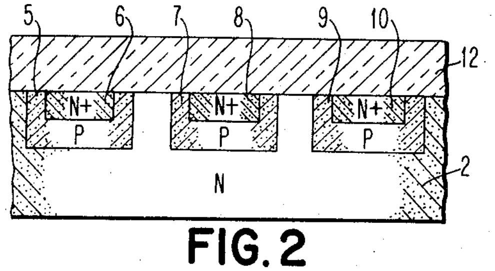

FIG. 2 shows the first step in the process of forming conductive connections to the N+ regions 6, 8 and 10 of the diodes. Dielectric film 12 is a thin film, preferably around 2,000 A thick. In the preferred embodiment, film 12 is silicon dioxide, although other insulating materials such as aluminum oxide or silicon nitride, which are well known as insulators in the semiconductor art, could also be used. The oxide is preferably formed by thermally oxidizing the silicon body.

Figure 3:
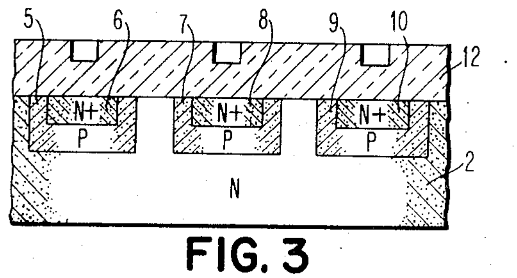

The next step of the process, illustrated in FIG. 3, is the formation of indentations in the dielectric layer, directly above the N+ regions 6, 8 and 10 of the diodes. If the dielectric film is an oxide of silicon, a solution of hydrofluoric acid buffered in ammonium fluoride is a suitable etchant. The etchant is used in a conventional process to remove around 500 A of oxide, thereby leaving around 1,500 A of dielectric above the N+ regions and 2,000 A atop the remaining regions of substrate 2. It will be understood that the indentations can be formed in other ways. For example, a first layer of $SiO_2$ could be thermally grown to a thickness of 1,500 A. The thickness around the desired indentation areas could then be increased by masking these areas and vapor-depositing a 500 A oxide layer.

The indentations ensure that the dielectric film is thinner at points where ohmic contact is to be made with the N+ regions than at other areas of the substrate surface. The surface area of each indentation is generally less than the area defined by the surface of the associated N+ region to ensure against contact being made to the P region in a subsequent step. The particular thickness of dielectric film 12 is not critical. It may be less than 2,000 A and a thickness of 10,000 A is also practical.

Figure 4:
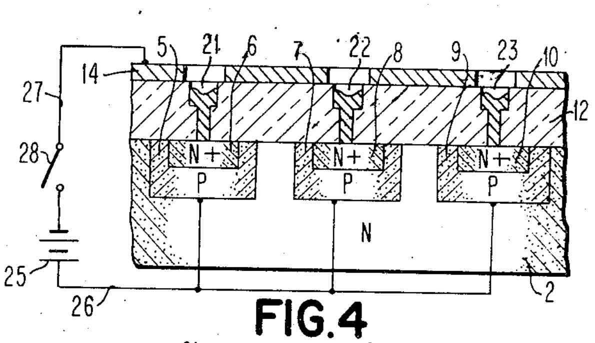

In FIG. 4, a thin metallic film 14 has been deposited on the surface of the dielectric film 12, the film initially forming a continuous coating over the surface and into the indentations in the dielectric film. The thin metallic film 14 is preferably a 1,000 A thick layer of aluminum although other metals which are conventionally used in semiconductor manufacture could be used; for example, molybdenum, tantalum or silver are also suitable. The aluminum may be deposited by any suitable means, such as evaporation, thermal-decomposition, or sputtering. In the preferred embodiment, the film is evaporated over entire surface of the dielectric film 12.

FIG. 4 also illustrates a source of potential 25 which is connected to metallic film 14 through connection 27 and to the P channels 5, 7 and 9 through connection 26, thereby providing a forward bias potential to the diodes when switch 28 is closed. It will be understood by those experienced in this field that the connections 26 and 27 which apply potential source 25 to forward bias the diodes are illustrated in schematic fashion only. In practice, metallic electrodes are provided at a peripheral area of the chip to connect the film 14 and the P regions 5, 7 and 9 to the potential source.

Source 25 supplies a potential which exceeds the breakdown potential of dielectric film 12 at the indentations. When switch 28 is closed the potential causes the metallic film 14 to diffuse through the dielectric layer 12 at the indentation areas, thereby shorting film 14 to N+ regions 6, 8 and 10 at via connections 21, 22 and 23, respectively. Simultaneously, the continuity of metallic film 14 is disrupted around the edges of the indentations. Hence, at this point, via connections 21, 22 and 23 make ohmic contact with the N+ regions 6, 8 and 10, respectively; but film 14 is disconnected from the via connections. This is the "-self-healing" effect adverted to previously.

To reinstitute the conductive connection between metallic film 14 and the via connections 21, 22 and 23, a second layer of metallization 16, which is also preferably aluminum, is deposited on the surface of metallization 14. This step will be discussed with reference to FIG. 5.

The potential source 25 applied through connections 26 and 27 in FIG. 3 causes the metallization to diffuse through the dielectric 12. After they have fulfilled their function of causing the dielectric film 12 to break down, connections 26 and 27 are no longer necessary for successful operation of the diode array or for the rewriting, which will take place in a future step.

The previous description completes the first steps in the process for forming the rewritable ROM. The "self-healing" effect is not limited to the use of silicon dioxide as the breakdown dielectric. It is known, for example, that aluminum oxide, silicon nitride and silicon nitride-on-silicon dioxide dielectric thin films will break down at a potential near, or slightly exceeding, their bulk breakdown. This is noted in the article by Wang et al. previously referred to.

In the preferred embodiment, using silicon dioxide having a thickness of around 2,000 A as the thin dielectric film, a potential of 50 volts at supply 25 applied between the thin aluminum metallization 14 and the P channels 5, 7 and 9 causes the film to break down. This causes a momentary short between metalization 14 and N+ regions 6, 8 and 10 through diffusions 21, 22 and 23, respectively. The open is quickly restored, however (self-healed), because of the disruption in the metallic film around the indentations at 21, 22 and 23.

Figure 5:
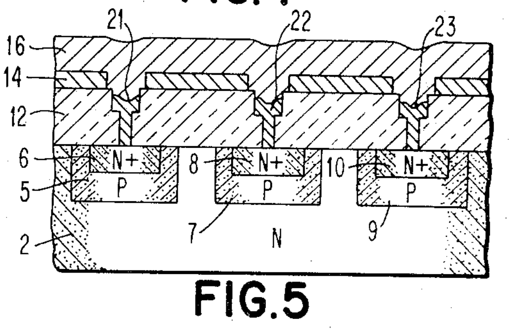

Referring to FIG. 5, metallization layer 16 is deposited in a well known manner, preferably to a depth of around one micron. The thickness of the aluminum 16 will be based on various factors, such as the current requirements of the diode array and the particular characteristics of the semiconductor chip. In the preferred process, the entire surface of the structure is coated with a layer of aluminum which is deposited by standard evaporation techniques. Instead of aluminum, other conventional metals, such as platinum, palladium, molybdenum or composites such as chromium-silver-chromium may also be used. At this point, the metal layers 16 and 14 may be considered as one conductive layer atop the chip connected to the N+ regions 6, 8 and 10 of the diodes by via connections 21, 22 and 23. To form an array of conductors which are orthogonal to the P type semiconductor channels 5, 7 and 9, the aluminum layers 14 and 16 on the surface of the dielectric layer 12 is removed by conventional etching techniques at selected areas between each row of diodes.

At this point in the process, the N+ active region of each diode is ohmically connected to an associated metallic conductor overlying the substrate. The P regions of each diode are also connected ohmically to appropriate contacts, not shown. Therefore, each diode of the array, in conventional terms, now represents a "1" bit in the memory.

Figure 6:
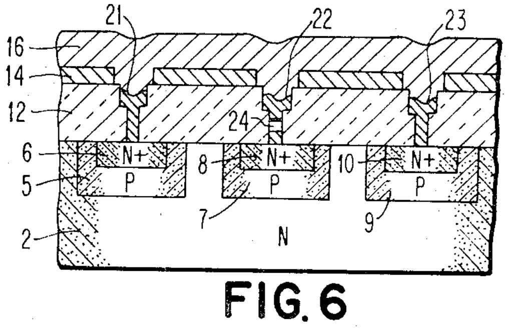
FIG. 6 is a sectional view of the diode array after current pulses have been used to rewrite the information in selected diodes.

FIG. 6 illustrates the next principal step of the process wherein information is written into selected diodes of the array which may be interpreted as a "0" bit in the binary memory array. In FIG. 6, via connection 22 above N+ region 8 and P region 7 is shown as having an open section 24 which breaks the connection between the metallization layer 16 and the N+ region 8. In the memory array, this open connection would indicate a "0" bit stored in this area of the semiconductor chip. The via connections 21 and 23, on the other hand, remain continuous, i.e., in the "1" bit state in which they were left in the previous step.

Figure 6A:
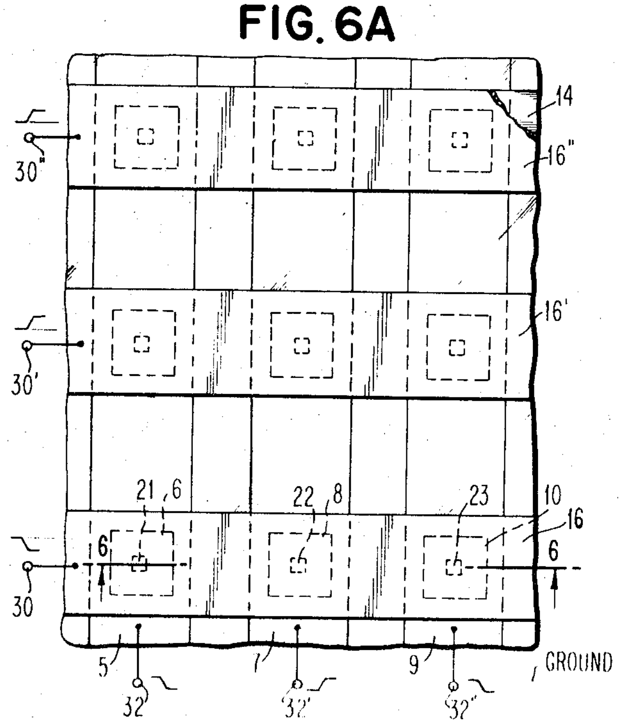
FIG. 6A is a view of the top surface of a portion of the diode array illustrating the technique for applying the current pulses.

FIG. 6A, a top view of the chip, illustrates the technique by which a "0" bit is written into the diode region defined by metallization connection 16 and P channel 7, the bits defined by regions 16–5 and 16–9 remaining as "1" bits. In addition, the "1" bits at each diode along rows 16′ and 16″ remain unchanged. Using conventional parlance, P channels 5, 7 and 9 are termed bit lines and the metallic conductors orthogonal to the P channels are termed word lines.

The technique by which the "0" bit is written is to forward bias the diode at word line 16 and bit line 7 (location 16–7) by a voltage pulse having a magnitude denoted as V*o*. the current pulse resulting is of sufficient magnitude to cause a disruption of the diffused filament at via connection 22. In practice, one-half V*o* is applied in the forward direction to the word line and one-half V*o* in the forward direction to the bit line as shown in FIG. 6A. This ensures that a bit "0" will be written only at the selected array location; in order to ensure that the other array points 16–5 and 16–9 remain as "1" bits, i.e., conductive, a half select voltage one-half V*o* is applied in the reverse direction at bit lines 5 and 9. So, in this case, at word line 16, a negative (forward) voltage shown as a step pulse is applied at terminal 30 and a positive (forward) step pulse is applied to bit line 7 at terminal 32′, thereby causing the interconnection 22 to break down at 24 (FIG. 6). To ensure the reliability of the connections at 21 and 23, a negative (reverse) voltage is applied at bit line terminals 32 and 32″ which applies a reverse or zero bias at their respective junctions. In effect the current seen by via connections 21 and 23 is zero. The process is similar for the remainder of the array.

In the preferred embodiment, it has been found that the resistance of filaments 21, 22 and 23 range from 10 ohms to 250 ohms and that the filaments can be opened using an average current of $I_0 = 8$ ma.

The direction of the current, $I_0$, through the filament is of no importance. The disruptive effect will occur for current in either direction. The particular reference in the preferred embodiment to "forward" and "reverse" currents is of concern only because the current is conveniently introduced to the filaments through the semiconductor diodes in the array.

The mechanism which causes the filament to open or disrupt as at 24 in FIG. 6 is apparently due to electromigration of the metallic atoms. The phenomenon of "electromigration," i.e., the mass transport of atoms in an electrical conductor due to collisions with electrons under heavy current flow, has been described by Ainslie et al. in U.S. Pat. No. 3,474,530, which is assigned to the assignee of the present invention. One aspect of that patent deals with the problems in the long-term reliability of electrical connections which are prone to undergo electromigration. It has been observed, for example, that the current density in a semiconductor integrated circuit may approach 1 million amps/$cm^2$, even though the total current may be only in the order of milliamps. Such heavy current flow has been found to cause temperature rises in the conductor which rapidly operate to accelerate the movement of material from one place to another. This results in depleted regions within the conductor which exacerbate the temperature rise, ultimately resulting in an open circuit.

The present invention puts the phenomenon of electromigration into a different perspective by using it to advantage in breaking the via connection between the metallic layer and the diode. The diameter of the filament is less than a micron, and a current of even a few milliamps causes a very high current density.

What has been described heretofore is a technique for forming a read-only memory which in itself would be useful in any number of commercial products. The technique has the advantages of using a microminiature semiconductor array; and the metallization connections have been formed in a minimal number of steps, thereby making the process simple and inexpensive. An additional advantage in the present structure is that practically no sensing circuits will be needed for sensing the information stored at each array point. The N substrate can be utilized as the collector of an NPN transistor at each bit location, which is inherent in the structure. By appropriately gating the bit lines, an entire word line of bits can be read and a selected bit gated by using the transistor at that bit location.

Of much greater interest than the above is the fact that the array shown is rewritable by electronic means. In the previous step, it was shown how a "1" bit may be selectively converted to a "0" bit by passing an appropriate current through the filamentary via connections so selected. It has been found that the diodes which have been so written can be reconverted to "1" bits, also by electronic means. This is accomplished by applying a healing voltage across a selected diode which has a "0" bit.

Figure 7:
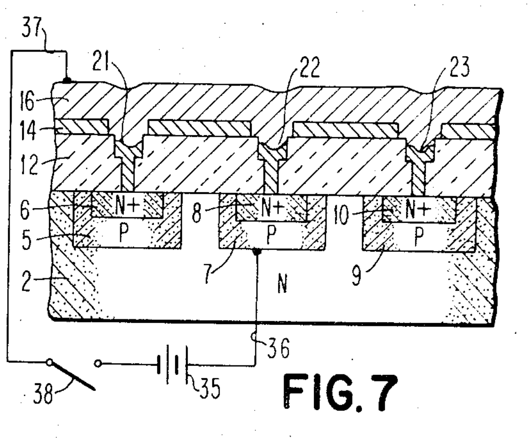
FIG. 7 is a sectional view of the array after a healing voltage has been used to return certain of said selected diodes to their original state.

As illustrated in FIG. 7, a source of potential 35 is connected to metallic film 14 through connection 37 and to P channel 7 through connection 36, thereby forward biasing the center diode when switch 38 is closed.

It will be understood by those experienced in this field that the connections 36 and 37 which apply potential source 35 to forward bias the diode are illustrated in schematic fashion only. In practice, metallic electrodes are provided at a peripheral area of the chip to connect the film 14 and the P region 7 to the potential source 35.

In the preferred embodiment, a potential between 2.5 to 3.0 volts causes the filament 22 to heal, eliminating gap 24 illustrated in FIG. 6. Thus the "0" bit stored at array location 16–7 is rewritten to a "1" bit.

The cycle of creating a "0" bit from a "1" bit and returning to a "1" bit is repeatable without apparent deleterious effect on the array. The "healing" voltage is quite uniform from diode to diode and from semiconductor chip to semiconductor chip. In addition, it has been found that the thickness of the thin metallic layer, the particular construction of the P and N regions and the exact thickness of the dielectric film is not critical. In general, the thicker the dielectric film, the greater the breakdown potential will be required to cause the thin metallization to diffuse to the semiconductor region. In addition, it has been found that the higher the resistance of the diffused filamentary via connection, the easier it is to break by an appropriate current pulse. These factors plus the repeatability of the rewriting process make the invention a very practical read-only-memory which has the advantage over prior art devices of being rewritable by electronic means.

While the invention has been particularly shown and described with reference to a preferred embodiment thereof, it will be understood by those skilled in the art that various changes in form and detail may be made therein without departing from the spirit and scope of the invention. For example, the invention is not limited to the structural details or methods of making the junction regions within the semiconductor substrates. Instead of a diode array a transistor array could be used as well. In addition, as already discussed, the metallization is not restricted to aluminum but any one of a number of metals which have been found suitable to provide conductive paths on the surface of semiconductor substrates are suitable, similarly, the dielectric film may comprise various compounds which have been found useful in the same regard.

What is claimed is:

1. In an array of P-N junctions formed in a semiconductor substrate wherein at least a first active region of the junctions is coplanar with the surface of the substrate, the method of fabricating an electronically rewritable read-only memory comprising the steps of:

forming a dielectric film over the substrate surface, the dielectric film being relatively thin in areas over said active regions;

depositing a thin metallic film over the dielectric film;

applying a breakdown potential across the metallic and dielectric films, causing the metal to diffuse through the thin areas of the dielectric as an ohmic via connection to the active regions, and causing the contact between the metallic film and the via connections to be disrupted around the thin areas of the dielectric;

depositing a second layer of metal over the metallic film to establish conductive contact between the metallic layer and the active junction regions;

applying a current pulse to selected via connection, thereby breaking the via connections, and disrupting the conductive contact between the metallic layer and the P-N junctions associated with the selected broken via connections.

2. A method according to claim 1 wherein the dielectric film is silicon dioxide having a thickness in its relatively thin areas of around 1500 A; and the breakdown potential is around 80 volts.

3. A method according to claim 1 wherein the thin metallic film is aluminum having a thickness of around 1000 A and the current pulse is in the range of a few milliamperes.

4. A method according to claim 1 wherein the forming of relatively thin areas in the dielectric film comprises the step of:

etching the dielectric film to the selected thickness in the areas over said active regions.

5. A method according to claim 1 wherein said junctions include a second active region in said substrate and the breakdown voltage is applied across the second active regions and the thin metallic film in the forward bias direction of the junctions.

6. A method according to claim 1 wherein said junctions include a second active region disposed in said substrate to form bit lines for the array and further comprising the step of:

etching the thin metallic film and the second layer of metal to form word lines orthogonally disposed with respect to the bit lines.

7. The method according to claim 6 wherein both said first and second active regions of each junction are coplanar with the substrate surface; and the relatively thin area of the dielectric film extends only over said first active region of each junction.

8. A method according to claim 6 wherein one half of the magnitude of said current pulse is applied to the word line of said via connections selected to be broken and one half of the magnitude is applied to the bit line of said selected via connections, the current being applied in the forward bias direction of the junctions associated with the selected via connections.

9. The method of rewriting a read-only memory fabricated in accordance with the method of claim 1 comprising the steps of:

applying a voltage pulse to selected broken via connections to heal the via connections, thereby reestablishing conductive contact between the metallic layer and the junctions associated with the reformed via connections; and applying a current pulse to selected unbroken via connections, thereby breaking the via connections and disrupting the conductive contact between the metallic layer and the junctions associated with the broken via connections.

10. A method according to claim 9 wherein:

the dielectric film is silicon dioxide having a thickness in its relatively thin areas of around 1500 A;

the breakdown voltage is around 80 volts;

the thin metallic film is aluminum having a thickness of around 1000 A;

the healing voltage is in the range of 2.5 to 3 volts; and the current pulse is in the range of a few milliamperes.

11. In a semiconductor substrate having diffused therein isolated channels of a first conductivity type and localized regions of a second conductivity type diffused within the channels to form a matrix array of P-N junctions, the method of fabricating an electronically rewritable read-only memory comprising the steps of:

forming a dielectric film over the substrate surface, the dielectric film being relatively thin in areas over said localized regions;

depositing a thin metallic film over the dielectric film;

applying a breakdown potential across the metallic and dielectric films, causing the metal to diffuse through the thin areas of the dielectric as an ohmic via connection to the localized regions, and causing the contact between the metallic film and the via connections to be disrupted around the thin areas of the dielectric;

depositing a second layer of metal over the metallic film to establish conductive contact between the metallic layer and the localized regions;

etching the thin metallic film and the second layer of metal to form over said regions of said second conductivity type word lines orthogonally disposed with respect to said isolated channels which operate as bit lines; and applying a current pulse to selected via connections, thereby breaking the via connections, and disrupting the conductive contact between the word lines and the junctions associated with the selected broken via connections;

whereby the unbroken via connections may be sensed as "1" bits and the broken via connections may be sensed as "0" bits in the memory.

12. The method of rewriting a read-only memory fabricated in accordance with the method of claim 11 comprising the steps of:

applying a voltage pulse to selected broken via connections to heal the via connections, thereby reestablishing conductive contact between the word lines and the junctions associated with the reformed via connections, and converting a "0" bit to a "1" bit in the memory;

applying a current pulse to selected unbroken via connections, thereby breaking the via connections and disrupting the conductive contact between the word lines and the junctions associated with the broken via connections, and converting a "1" to a "0" bit in the memory.

13. A method according to claim 12 wherein one half of the magnitude of said current pulse is applied to the word line of said via connections selected to be broken and one half of the magnitude is applied to the bit line of said selected via connections, the current being applied to forward bias the junctions associated with the selected via connections.

14. An electronically rewritable read-only memory comprising:

an array of P-N junctions formed in a semiconductor substrate, at least a first active region of each junction being coplanar with the surface of the semiconductor substrate;

a dielectric film disposed on the surface of said substrate, the film being relatively thin over said first active regions;

via connections diffused through the thin areas of the dielectric film in ohmic contact with said first active region of each diode to indicate a logic "1" bit, selected ones of the via connections being broken to indicate a "0" logic bit;

circuit means for applying a current pulse to selected unbroken via connections to break the previously unbroken via connections and thereby rewriting a logic "1" bit to a logic "0" bit;

circuit means for applying a healing voltage pulse to selected broken via connections to heal a previously broken via connection and thereby rewriting a logic "0" bit to a logic "1" bit.

15. A read-only memory as in claim 14 further comprising:

a second active region of each junction disposed in said substrate to form bit lines for the array; and conductive word lines disposed on the surface of the dielectric film orthogonal to the bit lines and connected by the diffused via connections to said first active regions of the junctions.

16. A read-only memory as in claim 15 wherein said semiconductor substrate is used as the collector of a transistor in which said first and second active regions of each junction comprise an emitter and a base region, respectively, thereby allowing bit selection by using the transistor for sensing a selected bit location.

17. An electronically rewritable read-only memory comprising:

an array of P-N junctions formed in a semiconductor substrate, at least a first active region of each junction being coplanar with the surface of the semiconductor substrate;

a second active region of each junction disposed in said substrate to form bit lines for the array;

a dielectric film disposed on the surface of said substrate, the film being relatively thin over said first active regions;

via connections diffused through the thin areas of the dielectric film in ohmic contact with said first active region of each junction to indicate a logic "1" bit, selected ones of the via connections being broken to indicate a logic "0" bit; and conductive word lines disposed on the surface of the dielectric film orthogonal to the bit lines and connected by the diffused via connections to said first active regions of the junctions.

18. A read-only memory as in claim 17 further comprising:

circuit means for applying a current pulse to selected unbroken via connections to break the previously unbroken via connections and thereby rewriting a logic "1" bit to a logic "0" bit; and circuit means for applying a healing voltage pulse to selected broken via connections to heal a previously broken via connection and thereby rewriting a logic "0" bit to a logic "1" bit.

* * * * *